Sept. 10, 1957  C. L. FLETCHALL  2,805,611
POWER DRIVEN HAND CULTIVATOR
Filed May 28, 1951
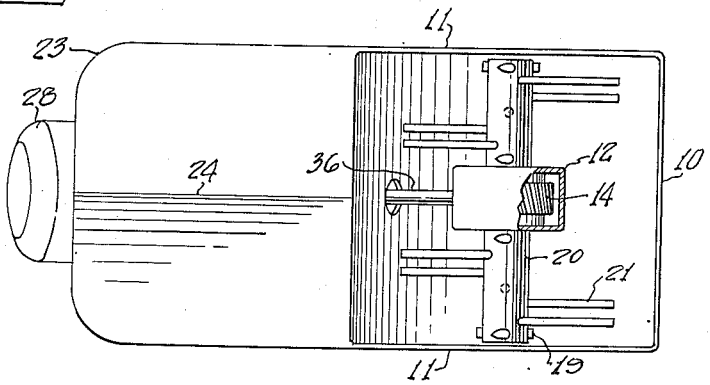
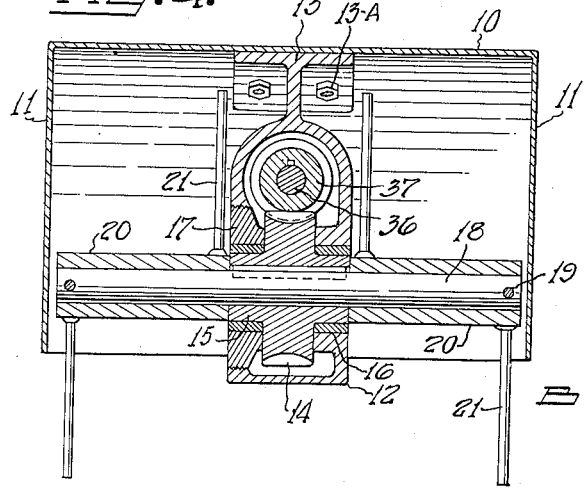
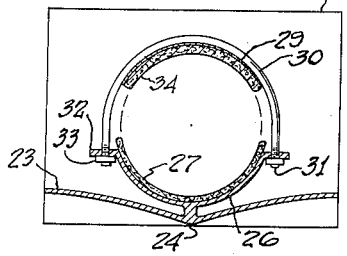
INVENTOR
CLEO L. FLETCHALL
BY
ATTORNEY

United States Patent Office 2,805,611
Patented Sept. 10, 1957

2,805,611

POWER DRIVEN HAND CULTIVATOR

Cleo L. Fletchall, Carlton, Oreg.

Application May 28, 1951, Serial No. 228,593

2 Claims. (Cl. 97—40)

This invention relates generally to cultivating implements and particularly to a power driven hand cultivator.

The main object of this invention is to provide a small, light-weight, and inexpensive power implement for hand cultivating around shrubs, flowers and small irregular plots in which larger cultivators could not be used.

The second object is to provide a cultivator devoid of wheels and having instead a mulch packing shoe which determines the depth of the cultivation.

The third object is to utilize the range limitation of an electrically driven implement for an implement having a small operating radius.

I accomplish these and other objects in the manner set forth in the following specifications as illustrated in the accompanying drawings, in which:

Fig. 1 is a side elevation of the implement with a portion of the hood broken away and showing the cultivated and uncultivated ground in section.

Fig. 2 is a bottom view of the implement with a part of the gear housing broken away.

Fig. 3 is a section taken along the line 3—3 in Fig. 1, showing the transverse shape of the depth controlling mulch packing shoe.

Fig. 4 is a transverse section taken along the line 4—4 in Fig. 1.

Like numbers of reference refer to the same or similar parts throughout the several views.

Referring in detail to the drawing, there is shown a semicylindrical hood 10 having the closed ends 11. A housing 12 is suspended within the hood 10 by means of a bracket 13 which is attached to the hood 10 by means of bolts 13-A. Within the lower portion of the housing 12 is a worm wheel 14 whose hubs 15 journal in the bushing 16, in the housing 12 and in the threaded plug 17 which forms a cover for the opening through which the wheel 14 is inserted into the housing 12.

Keyed within the worm wheel 14 is a cultivator shaft 18 whose ends project from the housing 12 and each projecting end has secured thereon, by means of a pin 19, a sleeve 20 from which radiate the spikes 21 whose ends 22 are bent in claw fashion. The spikes 21 are arranged in staggered relation.

Secured to one side of the hood 10 is the shoe 23 which curves upwardly and laterally forming a keel 24 along the middle thereof normal to the axis of the shaft 18.

A stiffening rib 25 is formed between the keel 24 and the hood 10.

Formed on the rear end of the shoe 23 is a saddle 26 having a soft liner 27. The motor 28 of an electric drill is mounted in the saddle 26. On top of the motor 28 is placed a short band 29, over which passes a U-shaped bolt 30 whose ends 31 pass downwardly through the flanges 32 to which they are secured by the nuts 33.

A soft pad 34 is placed between the band 29 and the motor 28.

The chuck 35 holds the shaft 36 which has keyed thereon the worm 37 which meshes with the worm wheel 14.

The handle 38 of the motor 28 is attached to the hood 10 by means of the bolts 13-A. Power is supplied to the motor 28 through a flexible cord 39 from a convenient outlet.

In the operation of the implement, the user merely places it on the ground with the shoe 23 resting flatly on the ground, and grasping the handle 38 guides the implement in the desired direction around the plants and shrubs, thoroughly pulverizing and aerating the soil and breaking up any root formation which may exist therein and, at the same time, smoothing and packing the mulch to hold the moisture therein.

I claim:

1. A wheelless hand cultivator comprising a hood, a rotary cultivating unit having a horizontal shaft mounted in said hood, said hood having a semi-cylindrical wall with a horizontal trailing edge extending parallel with said shaft, a broad ground-engaging shoe extending rearwardly from said trailing edge of said hood wall, said shoe having a width approximately co-extensive with the length of said trailing edge for smoothing and packing loose soil behind said cultivating unit, a motor mounted on said shoe and operatively connected with said shaft, and a handle on said cultivator having a hand grip mounted closely above said shoe and said hood for pressing said shoe and cultivating unit against the ground.

2. A wheelless hand cultivator comprising a hood, a rotary cultivating unit projecting below said hood and having a horizontal shaft mounted in said hood, said hood having a semi-cylindrical wall with a horizontal trailing edge extending parallel with said shaft, a broad soil smoothing and packing shoe extending rearwardly from said trailing edge of said hood wall, said shoe having a width approximately co-extensive with the length of said trailing edge for treatment of the soil loosened by said cultivating unit, a motor mounted on said shoe for driving said cultivating unit, and a longitudinal generally horizontal handle having opposite ends connected with said hood and said motor.

References Cited in the file of this patent

UNITED STATES PATENTS

| 2,574,237 | Barrow | Nov. 6, 1951 |
| 2,609,849 | Kronquist | Sept. 9, 1952 |
| 2,612,741 | McKay | Oct. 7, 1952 |
| 2,617,186 | Pickles | Nov. 11, 1952 |

FOREIGN PATENTS

| 194,113 | Switzerland | Feb. 1, 1937 |